United States Patent

Adams et al.

[11] Patent Number: 5,624,688
[45] Date of Patent: Apr. 29, 1997

[54] SELF-ALIGNING CUTTER HUB

[75] Inventors: Donald E. Adams, Bassett; Donald W. Smith, Fincastle, both of Va.

[73] Assignee: Gala Industries, Inc., Eagle Rock, Va.

[21] Appl. No.: 542,292

[22] Filed: Oct. 12, 1995

[51] Int. Cl.$^6$ ............... B29B 9/00; B29C 47/08
[52] U.S. Cl. ............... 425/67; 425/196; 425/313
[58] Field of Search ............... 425/67, 313, 311, 425/464, 196; 264/142; 464/144, 145

[56] References Cited

U.S. PATENT DOCUMENTS

| | | | |
|---|---|---|---|
| 1,916,442 | 7/1933 | Rzeppa | 464/145 |
| 2,047,660 | 7/1936 | Anderson | 464/144 |
| 3,176,477 | 4/1965 | Mazziotti | 464/144 |
| 3,196,487 | 7/1965 | Snelling | 425/67 |
| 3,266,090 | 8/1966 | Gosney | 425/313 |
| 3,982,840 | 9/1976 | Grosseau | 464/145 |
| 4,123,207 | 10/1978 | Dudley | 425/67 |
| 4,251,198 | 2/1981 | Altenburg | 425/67 |
| 4,500,271 | 2/1985 | Smith | 425/313 |
| 4,621,996 | 11/1986 | Hundley, III | 425/190 |
| 4,728,276 | 3/1988 | Pauley et al. | 425/67 |
| 5,059,103 | 10/1991 | Bruckmann et al. | 425/67 |
| 5,146,831 | 9/1992 | Fetter, Jr. et al. | 83/698 |
| 5,358,399 | 10/1994 | Ogoshi et al. | 425/311 |

FOREIGN PATENT DOCUMENTS

| | | | |
|---|---|---|---|
| 2638126 | 3/1978 | Germany | 425/311 |
| 61-233507 | 10/1986 | Japan | 425/196 |

Primary Examiner—Robert Davis
Attorney, Agent, or Firm—Jacobson, Price, Holman & Stern, PLLC

[57] ABSTRACT

A self-aligning pelletizer cutter hub having a self-aligning driving connection between the cutter hub and drive shaft for the hub in which the cutter hub is capable of universal pivotal movement as well as a driving connection between the drive shaft and cutter hub. The self-aligning hub includes an adapter mounted on the end of a drive shaft with the adapter having a partial spherical outer surface that matches a partial spherical inner surface or bore in the cutter hub. The adapter includes diametrically located recesses for receiving spherical balls which are also received in recesses in the inner surface of the cutter hub to transmit driving force from the adapter to the cutter hub. The inner surface of the cutter hub also includes longitudinal recesses extending to one edge thereof and associated with the ball recesses to enable assembly of the balls and the partially spherical surface of the adapter into the hub bore when the adapter is arranged in 90° relation to the surface of the cutter hub with the adapter and balls being inserted into the bore and recesses and then rotated 90° to be parallel to the surfaces of the hub. This locks the adapter in the inner surface of the bore in the cutter hub to maintain the components in assembled relation but yet enable the cutter hub to move universally within the limits defined by the matching partial spherical surfaces with the spherical balls transmitting rotational torque to the hub from the adapter which is rigidly affixed to the drive shaft.

15 Claims, 3 Drawing Sheets

5,624,688

SELF-ALIGNING CUTTER HUB

BACKGROUND OF THE INVENTION

Field of the Invention

The present invention generally relates to the mounting of a cutter hub on a shaft for orienting the cutter hub and blades mounted thereon in optimum aligned relation to the die face of an extrusion die plate of an underwater pelletizer. More specifically, the present invention relates to a self-aligning cutter hub having a self-aligning driving connection between the cutter hub and drive shaft for the hub with the cutter hub being capable of universal angular pivotal movement in relation to the drive shaft and cutter hub. The self-aligning hub includes an adapter mounted on the end of a drive shaft with the adapter having a partial spherical outer surface that matches a partial spherical inner surface or bore in the cutter hub. The adapter includes diametrically located recesses for receiving a spherical ball which are also inserted into unique recess arrangements in the inner surface of the cutter hub to transmit driving force from the adapter to the cutter hub. The inner surface of the cutter hub includes longitudinal recesses extending to one edge thereof to enable assembly of the balls and the partially spherical surface of the adapter when the adapter is arranged in 90° relation to the surface of the cutter hub with the adapter and balls being inserted into the bore and recesses and then rotated 90° to be parallel to the surfaces of the hub. This locks the adapter in the inner surface of the bore in the cutter hub to maintain the components in assembled relation but yet enable the cutter hub to move universally within the limits defined by the matching partial spherical surfaces with the spherical balls transmitting rotational torque to the hub from the adapter which is rigidly affixed to the drive shaft.

DESCRIPTION OF THE PRIOR ART

Underwater pelletizers for forming plastic pellets by the use of an extrusion die having orifices through which molten polymer is extruded through a die face for engagement by cutter blades mounted on a rotatable cutter hub and driven by a drive shaft is well known. One of the problems which exists with current equipment is the necessity of maintaining the cutters and die face in properly aligned relation in order that the cutting edge of the blades on the cutter hub move in very close parallel relation to the die face to efficiently cut the extruded plastic into pellets as it is discharged from the orifices in the extrusion die plate. The following U.S. patents, owned by the Assignee of this application, relate to underwater pelletizers, cutter hub assemblies and structures for positioning the cutters and cutter hub in desired relation to the die face of the die plate.

| | |
|---|---|
| 4,123,207 | 4,621,996 |
| 4,251,198 | 4,728,276 |
| 4,500,271 | 5,059,103 |

While the above listed patents and the references cited in those patents which are incorporated herein by reference thereto disclose various underwater pelletizer structures and components thereof, they do not disclose a self-aligning cutter hub.

In addition to the above U.S. patents, the following U.S. patents are also known to Applicants.

U.S. Pat. No. 1,916,442
U.S. Pat. No. 3,176,477
U.S. Pat. No. 3,196,487
U.S. Pat. No. 5,146,831

U.S. Pat. No. 3,196,487 discloses a spring biased hub and blade assembly in a pelletizer in which the radial clearance between the splines of a spline drive enables a limited degree of alignment of the cutter knives with the die face. U.S. Pat. No. 5,146,831 discloses a quick disconnect coupling between the cutter hub and shaft together with a tool for use in connecting and disconnecting the hub from the shaft. U.S. Pat. Nos. 1,916,442 and 3,176,477 relate to constant velocity universal joints which enable transfer of power between shafts that are angularly related. However, the relationship of the components in the universal joints are not the same as the relationship of the components in this invention.

SUMMARY OF THE INVENTION

An object of the present invention is to provide a self-aligning cutter hub for connecting the cutter hub to a drive shaft with the self-aligning hub enabling the cutter blades on the cutter hub to maintain optimum parallel relation to the die face of an extrusion die plate in a pelletizer to efficiently cut the extruded plastic material into pellets.

Another object of the invention is to provide a self-aligning cutter hub mounted on a drive shaft by a unique structure which enables limited universal movement of the cutter hub in relation to the rotational axis of the drive shaft with the components being constructed in a manner to enable effective assembly of the components of the cutter hub.

A further object of the invention is to provide a self-aligning cutter hub in accordance with the preceding objects in which the hub includes a central bore defining an inner face and an adapter received in the bore and fixedly attached to the end of a drive shaft with the inner surface of the hub bore and the outer surface of the adapter provided with corresponding partial spherical surfaces which coact to enable universal movement of the cutter hub in relation to the drive shaft.

Still another object of the invention is to provide a self-aligning cutter hub in accordance with the preceding objects in which the adapter is screw threaded to the end of the drive shaft and includes a pair of diametrically arranged recesses for partially receiving spherical balls used to transmit driving torque from the drive shaft to the cutter hub.

A still further object of the invention is to provide a self-aligning cutter hub in accordance with the preceding objects in which the inner surface of the cutter hub bore includes a pair of diametrically opposed axial recesses extending inwardly from one side surface of the cutter hub but not extending completely to the other end of the cutter head with the recesses enabling assembly of the adapter and torque transmitting balls into the bore when the adapter is oriented in 90° relation to the surface of the cutter hub with the adapter then being rotated 90° to register the partially spherical surfaces in the bore of the cutter hub and on the outer surface of the adapter with each other.

Yet another significant object of the invention is to provide a self-aligning cutter hub in accordance with the preceding objects in which the recesses in the inner surface of the cutter head bore includes a centrally disposed recess or groove receiving the torque transmitting balls during assembly of the adapter with pivoting of the adapter into final position locking the torque transmitting balls in position and assembly of the adapter onto the drive shaft being obtained by a screw threaded engagement between the drive shaft and internal surface of the adapter.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
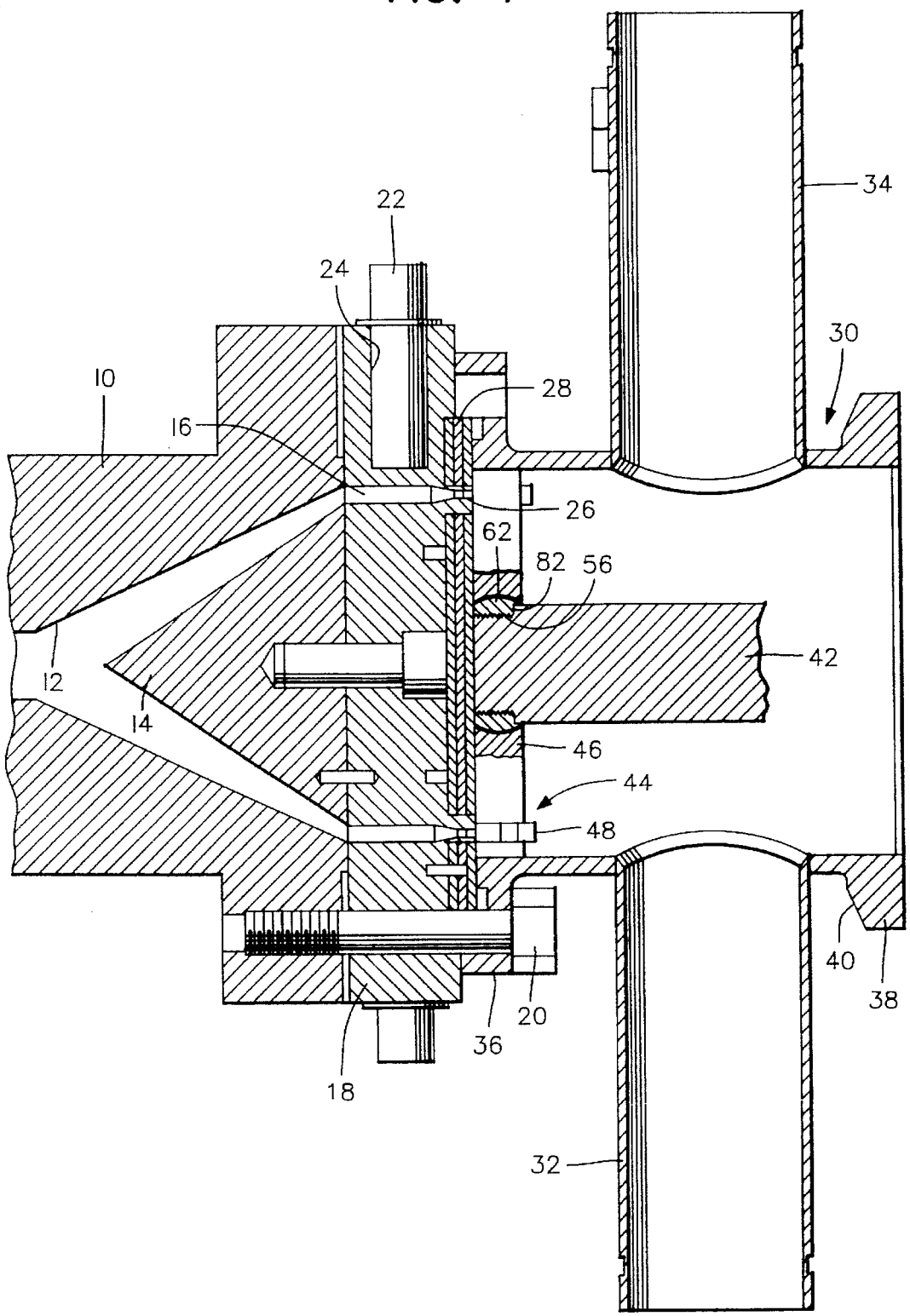
FIG. 1 is a sectional view of a pelletizer illustrating the self-aligning cutter hub associated with other components of a pelletizer.

Referring now to the drawings, FIG. 1 illustrates an underwater pelletizer structure with the self-aligning hub of the present invention incorporated therein. The pelletizer includes an inlet housing 10 including an inlet passageway 12 for receiving molten polymer from upstream equipment. The molten polymer is diverted outwardly by a nose cone 14 and enters into a plurality of extrusion orifices 16 in a die plate 18. The die plate 18 is secured to the inlet housing by fastening bolts or the like 20 and is provided with heating elements 22 located in cavities 24 in the die plate. The die plate includes a die face 26 of wear resistant material which is mounted on the die plate along with heat transfer plates 28. Attached to the housing and die plate is a cutter chamber generally designated by reference numeral 30 which includes a water circulating inlet passageway 32 and a discharge passageway 34 for water and pellets. The cutting chamber includes a flange 36 attached to the die plate and housing and a flange 38 at the opposite end thereof having an inclined surface 40 for association with a similar flange on an adapter connected to a drive unit. A drive shaft 42 extends through the cutter chamber 30 and supports and drives a cutter assembly 44 which includes a hub 46 and a plurality of cutter knives 48 having their cutting edge associated with the die face 26 and the discharge point of the orifices 16. All of the above mentioned structure is conventional with the present invention relating specifically to the hub 46 and the manner in which it is attached to the drive shaft 42 and supported therefrom for self-alignment of the hub and thus the cutting elements 48 with the die face 26.

Figure 2:
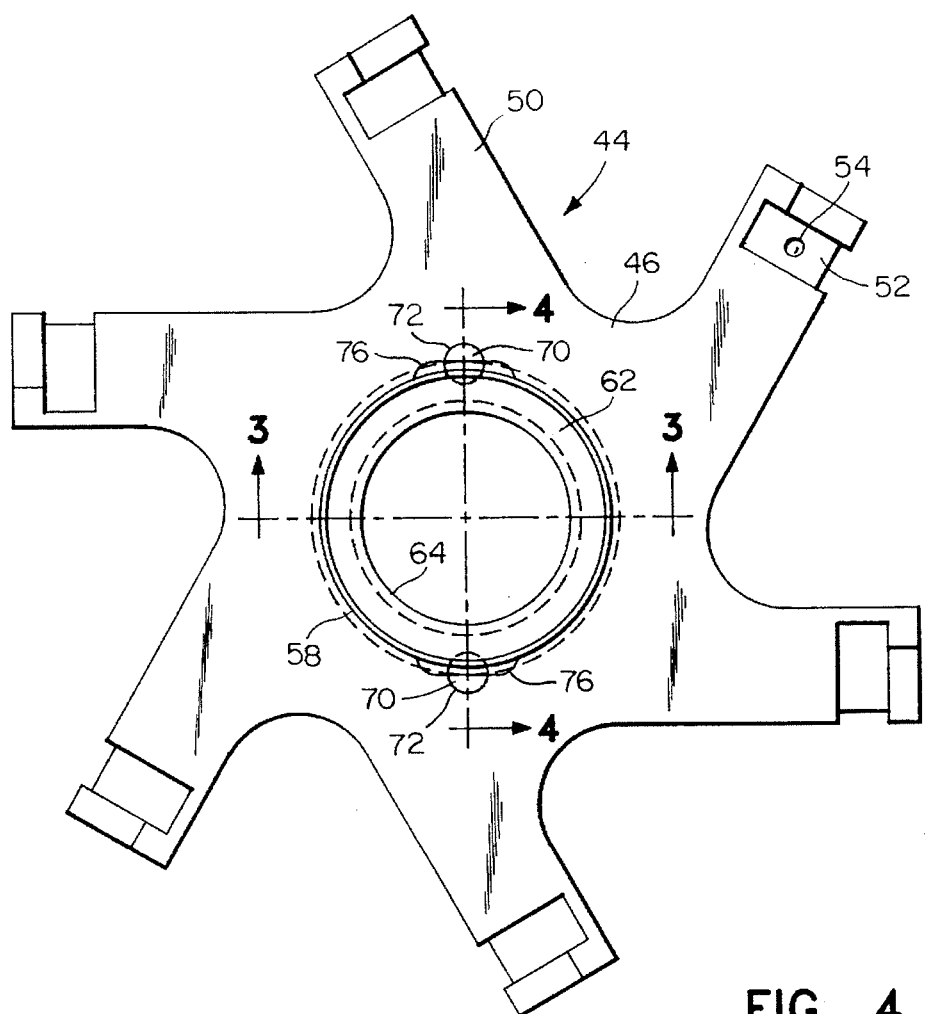
FIG. 2 is an end elevational view of the cutter hub without the cutter knives and illustrating the orientation of the components of the hub.
Figure 3:
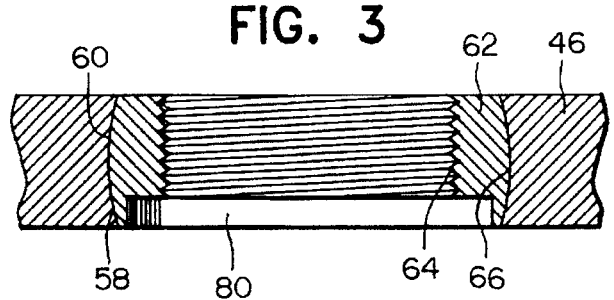
FIG. 3 is a sectional view, on an enlarged scale, taken along section line 3—3 on FIG. 2 illustrating the matching relationship between the corresponding partial spherical surfaces on the exterior of the adapter and on the interior of the bore through the cutter hub.

As illustrated in FIG. 2, the cutter assembly 44 includes a plurality of arms 50 having notches 52 which receive the cutter blades that are secured by the use of conventional fasteners threaded into threaded bores 54 as is well known in the art. The arms 50 are integral with the central hub 46 which is connected to a reduced externally threaded end portion 56 on the drive shaft 42. The hub 46 is provided with an axial bore 58 extending therethrough and which has an inner face that is partially spherical as indicated by reference numeral 60 and as illustrated in FIGS. 3 and 5. Positioned in the bore 58 is an adapter 62 having an internally threaded bore 64 extending therethrough for threading onto the threaded reduced end 56 of the shaft 42. The exterior surface of the adapter 62 is partially spherical as indicated by reference numeral 66 and as shown in FIGS. 3-5 with the curvature of the partially spherical surfaces 60 and 66 matching or corresponding and closely associated as illustrated in FIG. 3 with the diameter of the partially spherical surfaces at the end edges thereof being less than the diameter at the central portions of the partially spherical surfaces.

Figure 4:
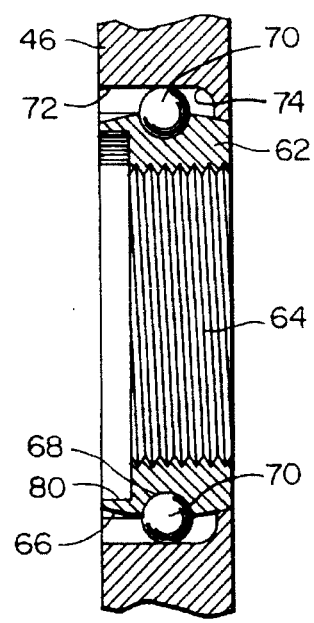
FIG. 4 is a sectional view, on an enlarged scale, taken along section line 4—4 on FIG. 2 illustrating further structural details of the self-aligning cutter hub including the recesses in the cutter hub.
Figure 5:
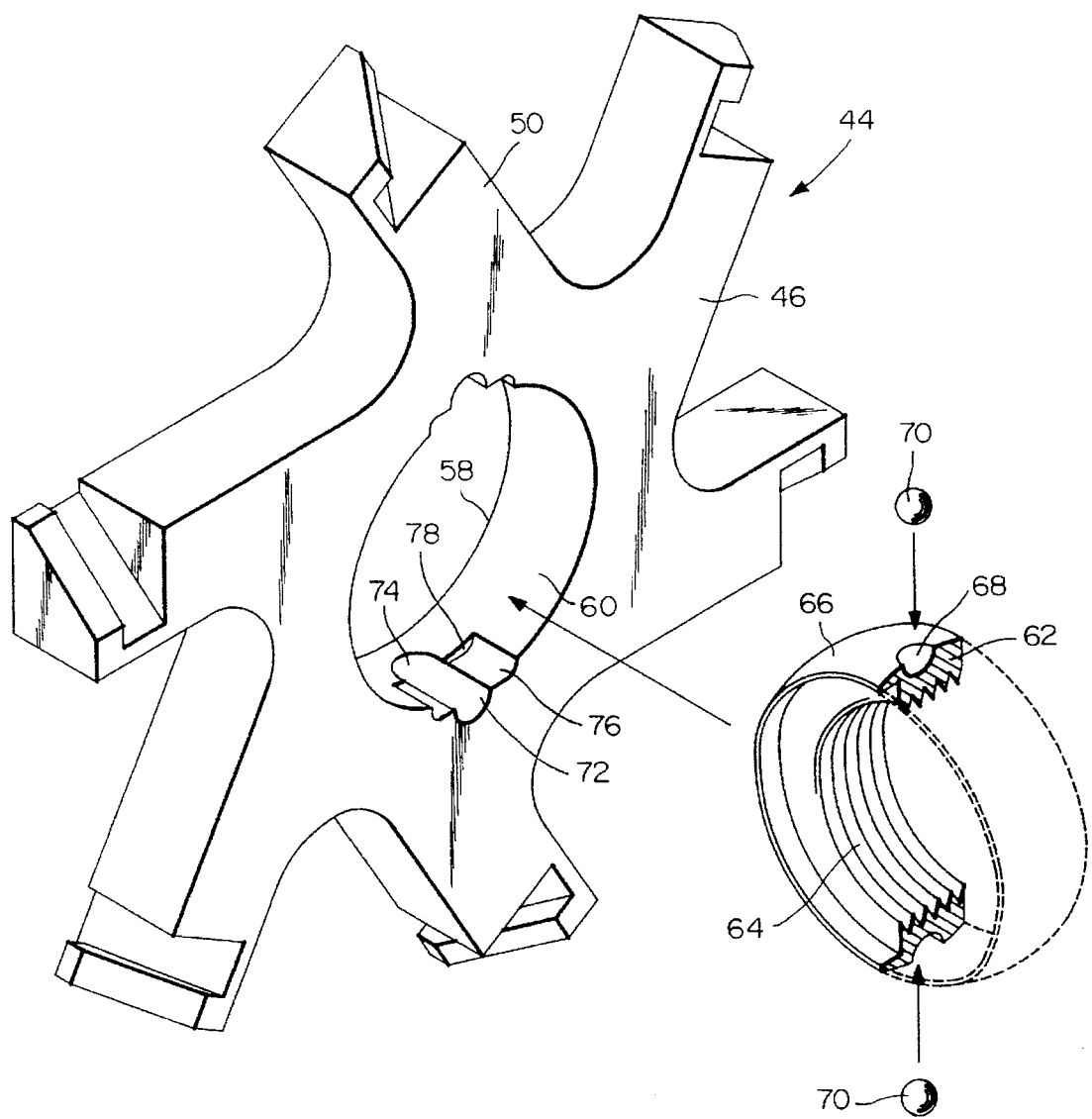
FIG. 5 is an exploded perspective view illustrating the structure of the cutter hub and adapter and the manner in which the adapter is assembled in the bore in the cutter hub.

The partially spherical exterior surface 66 of the adapter 62 is provided with a pair of diametrically opposed generally semispherical recesses 68 oriented equally distant from the end edges of the partially spherical surface 66 as illustrated in FIGS. 4 and 5. Received in each of the semispherical recesses 68 is a spherical ball 70.

The hub bore 58 includes a pair of diametrically opposed axial, semicylindrical recesses 72 which terminate at their inner ends in adjacent but spaced relation to the opposite end of the bore 58 and terminate in a partially spherical inner end 74. The recesses 72 receive the balls 70 which provide for torque transfer from the shaft 42 and adapter 62 to the hub 46.

In order to assemble the adapter 62 and balls 70 with respect to the bore 58, the bore 58 includes an axial recess 76 which extends circumferentially a short distance from the edges of the recess 72 and terminates at an inner end 78 spaced from the spherical portion 74 of the recess 72. The recesses 76 are provided to enable the partially spherical surface 66 of the adapter 62 to be inserted into the bore when the adapter 62 is oriented in perpendicular relation to the bore as illustrated in FIG. 5. The balls 70 being placed and retained in the cavities 68 in a suitable manner by the application of grease or the like are inserted into the recesses 72 when the assembled adapter 62 is moved into the bore 58 until the balls 70 reach a central point between the two ends of the bore 58. At this point, the adapter 62 can be rotated 90° into the bore 58 with the partially spherical surfaces 60 and 66 being in close registry as illustrated in FIG. 3 with the curvature of the surfaces 60 and 66 serving to retain the adapter 62 within the bore 58 and retain the balls 70 in the recesses 68 and 72.

The balls 70 transmit driving torque and the surfaces 60 and 66 enable the hub 46 to pivot in a universal direction with respect to the drive shaft thereby enabling the cutter hub and cutter knives 48 to be oriented in parallel closely spaced relation to the die face for efficient cutting of the extruded plastic into pellets. After the adapter has been assembled into the cutter hub from the position illustrated in FIG. 5 to the position illustrated in FIGS. 2-4, the cutter hub and adapter can be mounted on the drive shaft 42 by engaging the internal threads 64 with the external threads 56 until the axial recess 80 formed in one end of the adapter 62 receives the shoulder 82 on the end of the shaft with the matching spherical surfaces 60 and 66 being oriented slightly outwardly of the periphery of the drive shaft in view of the distance between the periphery of the internal recess 80 and the periphery of the surfaces 66 and 60 radially outwardly thereof. This enables the cutter hub to pivot universally on the adapter 62. The assembled hub and adapter may be manually screw threaded onto the shaft threads 56 to attach or detach the adapter and hub. If necessary, a wooden hammer may be used to lightly tap the hub to tighten or loosen the hub. While the self-aligning hub has been disclosed in association with a cutter assembly for underwater pelletizers, it can be adapted for other uses in which a rotating component is attached to a shaft to enable the rotating component to align with an associated structure.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A self-aligning cutter hub for use in an underwater pelletizer connected to a drive shaft and enabling cutter blades on the cutter hub to be aligned with and move in parallel relation to a die face on an extrusion die plate, said cutter hub including a centrally located axial bore defined by an inner surface, said inner surface of the bore being partially spherical, an adapter in the form of an annular member received in said bore, said adapter including a partially spherical outer surface with the partially spherical surfaces being closely related and matching each other, each of the partially spherical surfaces including at least one recess receiving a torque transmitting element partially received in the recesses in the matching surfaces to drivingly connect the hub to the adapter and enable pivotal movement of the hub in relation to the adapter by relative angular movement of the hub in relation to the adapter, said adapter secured to a drive shaft for transmitting torque to the cutter hub.

2. The cutter hub as defined in claim 1 wherein said recess in the partially spherical outer surface of the adapter is substantially semispherical in configuration.

3. The cutter hub as defined in claim 2 wherein said recess in the inner surface of the cutter hub is semicylindrical in configuration and communicates with an end surface of the cutter hub to enable assembly of the adapter with the cutter hub by receiving the torque transmitting element within the recess in the cutter hub.

4. The cutter hub as defined in claim 3 wherein said partially spherical surface in the cutter hub includes an arcuate recess extending axially from a surface of said cutter hub, said arcuate recess extending circumferentially to both sides of the semicylindrical recess in the cutter hub to enable insertion of the partially spherical surface of the adapter when the adapter is oriented in 90° relation to the cutter hub and inserted into the cutter hub bore with the semicylindrical recess receiving the torque transmitting element and the arcuate recess receiving the partially spherical surfaces on the adapter to enable assembly of the adapter by moving it inwardly into the bore when in 90° relation to the cutter hub and then pivoting it 90° to orient the partially spherical surfaces in registry with each other.

5. The cutter hub as defined in claim 4 wherein the interior of the adapter is internally threaded for screw threaded engagement with a reduced threaded end on said drive shaft, said partially spherical surface on the adapter enclosing a portion of the end of the drive shaft to enable self-aligning pivotal movement of the cutter hub in relation to the drive shaft and adapter to enable the cutter hub and blades mounted thereon to be aligned with the die face on the die plate.

6. A self-aligning hub for connection with a drive shaft to enable the hub to pivot universally in relation to a rotational axis of the drive shaft, said hub including a bore therethrough having an inner surface provided with an arcuate curvature whose center is substantially at the center of the hub, an adapter received in said bore for driving connection with the drive shaft, said adapter having an arcuately curved outer surface whose center is also substantially at the center of the hub to enable relative angular movement of the hub as edge portions of the adapter move out of alignment with end surfaces of the hub, and torque transmitting members interconnecting the outer surface of the adapter and the inner surface of the hub bore for driving said hub.

7. The hub as defined in claim 6 wherein the torque transmitting members are spherical balls partially received in recesses in each of the curved surfaces.

8. The hub as defined in claim 6 wherein the outer surface of the adapter includes a pair of recesses, the inner surface of the bore including axial recesses receiving the torque transmitting members and enabling insertion of the exterior surface of the adapter into the inner surface of the bore when the adapter is at 90° to the bore with the adapter being rotated 90° to be received within the bore with the matching curved surfaces and the torque transmitting members retaining the adapter in the bore after assembly.

9. In an underwater pelletizer including a die plate having a plurality of extrusion orifices terminating at a die face, a cutter assembly mounted on a drive shaft for rotating the cutter assembly in facing relation to the die plate, said cutter assembly including a plurality of cutting elements movable in close parallel relation to the die face for cutting plastic extruded from the orifices into pellets, the improvement comprising said cutter assembly having a hub mounted on the drive shaft in a manner to enable substantial universal pivotal movement in relation to the drive shaft for self-alignment of the cutting elements with the die face, said hub including a bore therethrough at the center thereof, said bore being defined by an inner face with a partial spherical surface, and adapter mounted on said drive shaft, said adapter having a partial spherical surface, said adapter being received in said bore with the partial spherical surfaces being in opposed relation to enable substantial universal pivotal movement of the hub in relation to the drive shaft, each partial spherical surface including opposed recesses receiving torque transmitting members to drive the hub while permitting said substantial universal pivotal movement.

10. The hub as defined in claim 6 wherein the curved outer surface of the adapter includes a pair of diametrically opposed recesses, the inner surface of said bore including a pair of diametrically opposed recesses aligned with the recesses in said outer surface of the adapter, each of said recesses in the inner surface of the bore having one end extending to one end of the bore, the other end of the recess in the inner surface of the bore being spaced inwardly from the other end of the bore, said torque transmitting members being partially received in the aligned recesses for transmitting driving torque from the adapter to the hub, said recesses in the inner surface of the bore enabling axial insertion of the adapter and torque transmitting members oriented in the recesses in the outer surface of the adapter for assembly of the adapter and hub.

11. The hub as defined in claim 10 wherein said torque transmitting members are spherical balls, each of said recesses in the curved outer surface of the adapter being substantially semispherical for receiving a portion of one said torque transmitting ball, said recesses in the inner surface of the bore being substantially semicylindrical to enable insertion of said adapter and said balls into the recesses in the inner surface of the bore, each of said recesses in the inner surface of the bore having a partial spherical inner end for engaging a portion of one said torque transmitting ball.

12. The hub as defined in claim 11 wherein each of said semicylindrical recesses includes lateral recesses extending a short distance circumferentially in the inner surface of the bore from opposite edges of the semicylindrical recesses to enable the outer curved surface of the adapter to be inserted into the inner curved surface of the bore when the adapter is perpendicular to the hub and enabling the adapter to rotate 90° into alignment with the hub with the curved surfaces on the adapter and in the hub to retain and support the hub on the adapter.

13. The cutter hub as defined in claim 1 wherein said drive shaft has an externally threaded end portion, said adapter having an internally threaded inner surface screw threaded onto the threaded end portion of said drive shaft thereby securing the adapter to the drive shaft.

14. The cutter hub as defined in claim 13 wherein said threaded end portion of said drive shaft is of reduced diameter to form a shoulder engaged by the adapter when screw threaded onto the threaded end portion of said drive shaft.

15. A self-aligning cutter hub for use in an underwater pelletizer connected to a drive shaft and enabling cutter blades on the cutter hub to be aligned with and move in parallel relation to a die face on an extrusion die plate, said cutter hub including a centrally located axial bore defined by an inner surface, said inner surface of the bore being partially spherical, an adapter in the form of an annular member received in said bore, said adapter including a partially spherical outer surface with the partially spherical surfaces being closely related and matching each other, each of the partially spherical surfaces including two partially spherical recesses diametrically opposed to each other, a torque transmitting ball partially received in each aligned pair of recesses to enable relative pivotal movement of the hub in relation to the adapter, said adapter secured to a drive shaft for transmitting torque to the cutter hub.

* * * * *